Oct. 14, 1941.  E. L. SUTTER  2,259,399
EMERGENCY TIRE TRUCK
Filed July 22, 1940
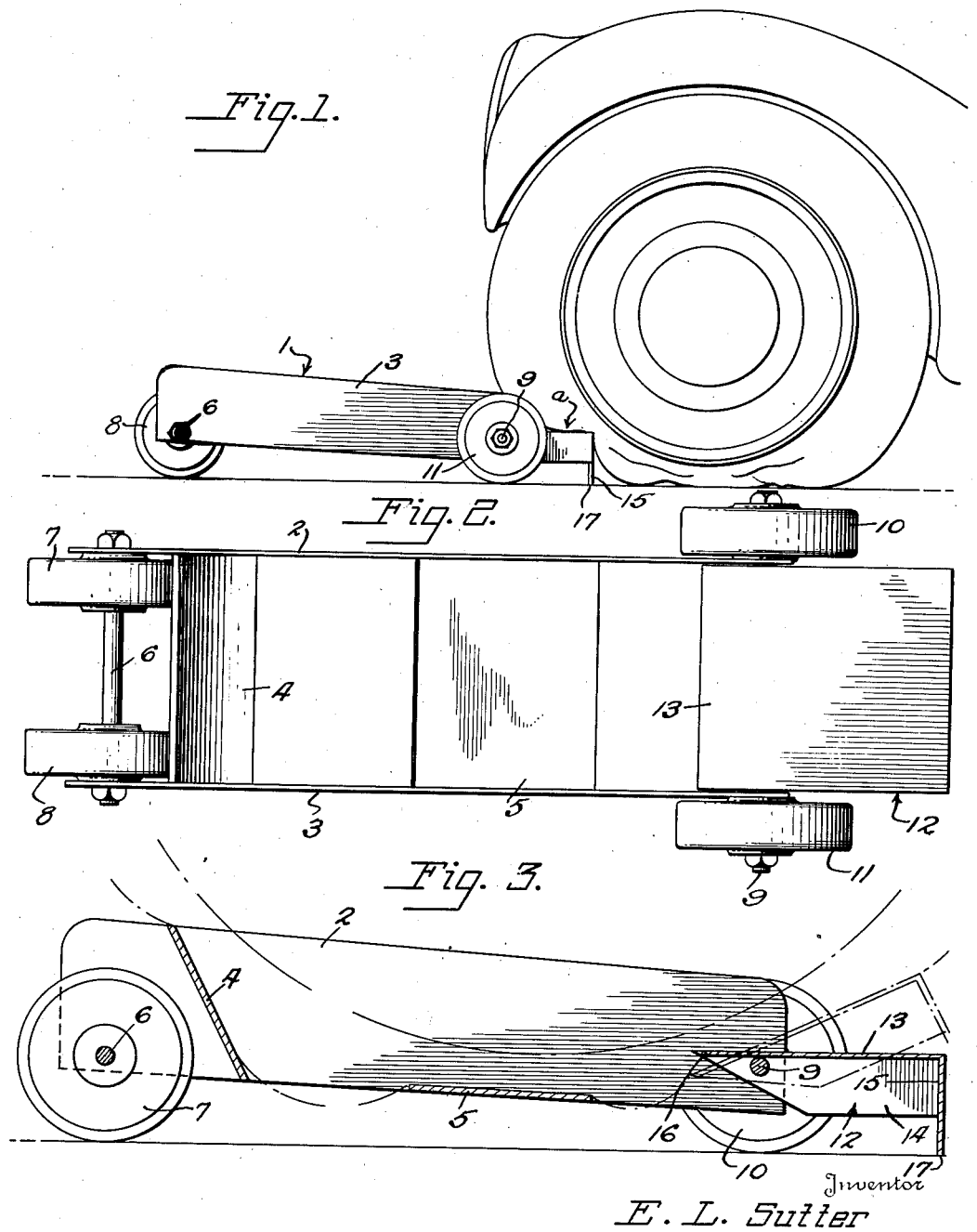
E. L. Sutter
By Mason Fenwick & Lawrence
Attorneys Patented Oct. 14, 1941

2,259,399

UNITED STATES PATENT OFFICE 2,259,399

EMERGENCY TIRE TRUCK

Erwin Louis Sutter, Boston, Mass., assignor to The Sutter Co., Inc., Allston, Mass.

Application July 22, 1940, Serial No. 346,839

3 Claims. (Cl. 280—61)

This invention relates to an emergency flat tire truck for supporting the disabled wheel of an automobile so as to permit the automobile to be driven under its own power to a repair station without damage to the wheel or tire.

One of the objects of the invention is to provide a wheeled device of the character described upon which the disabled wheel may be driven, and which will automatically chock the wheel in place on the truck, obviating the need of any other fastening means so that the automobile may be driven at fair speed without the risk of the wheel jumping the truck or becoming displaced relative thereto in any other manner.

Another object of the invention is to provide a truck of the type described, having a wheel supported body or chassis comprising rigidly related side members and an inclined front end member with a flat transverse bottom member, forming a stall or compartment for receiving the disabled wheel, and having a swingable member at its opposite end hingedly mounted at an intermediate point constituted to act as a ground gripping platform upon which the wheel mounts in being driven upon the truck, without lifting the truck wheels from the ground or pushing the truck before it, and which tilts under the weight of the disabled wheel when the latter has moved to its fully seated position upon the truck, cooperating with the inclined front end member to chock the wheel against displacement.

A further object of the invention is to provide a truck as described, in which the wheel supporting members including the pivoted platform, are flat, and the pair of truck wheels adjacent the pivoted platform are carried outside the body laterally of the platform so that they cannot possibly come into contact with the sides of the tire of the disabled wheel.

Another object of the invention is to place the front supporting wheels of the truck outside of the wheel seating compartment and within the confines of the extended front ends of the side members, whereby the front of the wheel base of the truck is narrower than the rear, facilitating its dirigibility when used on one of the front wheels of the automobile.

Other objects of the invention will appear as the following description of a preferred and practical embodiment thereof proceeds.

In the drawing which accompanies and forms a part of the following specification, and throughout the several figures of which the same characters of reference have been employed to designate identical parts:

Figure 1 is a side elevation of an emergency wheel truck embodying the principles of the present invention, showing an automobile wheel with deflated tire being driven upon the emergency truck;

Figure 2 is a top plan view of the emergency truck; and

Figure 3 is a longitudinal vertical section through the same.

Referring now in detail to the several figures, the numeral 1 represents the emergency truck in general, the body of chassis of which is constituted by the rigid spaced parallel upstanding side members 2 and 3 which are rigidly connected as by welding or in any other suitable manner to the downwardly inclined end member 4 and the transverse bottom member 5.

The front ends of the side members 2 and 3 project forwardly of the end member 4 and support the front axle 6 which carries the wheels 7 and 8, inboard with respect to the extended ends of the side members.

The opposite end of the chassis or body of the emergency truck is normally open, as shown, and is transsected by the axle 9 which supports the rear wheels 10 and 11, the latter being mounted outboard with respect to the side members 2 and 3.

The mounting of the front wheels inboard, and the rear wheels outboard of the chassis gives the wheel base a forwardly tapered effect, approaching three-point support, which makes the truck more readily dirigible when it is used in connection with the front wheel of an auto vehicle.

As the emergency truck finds its almost universal usage in relation to a wheel having a deflated tire, which wheel is flat at its point of contact with the truck, the wheel engaging elements of the truck are likewise flat, contributing to the firm seating of the wheel, avoidance of damage to the tire, and increase of friction, so that there is no danger of the wheel turning under power and rolling off of the truck, for the magnitude of the friction is such that through the differential, the power of the automobile is applied solely to the wheel on the opposite end of the axle of the automobile.

It is customary in devices of this type to provide an inclined ramp at the rear upon which the disabled wheel mounts when driven upon the emergency truck through the power of the automobile. The defect of most such devices is that there is a powerful component of the driving force directed longitudinally of the truck which tends to push the truck forwardly from beneath the wheel, making it difficult to drive the wheel upon the truck. In certain instances it has been proposed to have the weight of the automobile lift the rear wheels of the emergency truck from the ground at the time the disabled wheel mounts upon the ramp, the purpose being to increase the friction of the ramp against the ground, but such expedients are ineffectual, particularly upon smooth pavements, in view of the magnitude of the forwardly directed components of the driving force of the automobile.

The present invention disposes of this drawback by dispensing altogether with an inclined ramp and providing, in lieu thereof, a mounting platform which in general is designated by the reference character 12. This platform comprises a girder member including a flat plate 13 having vertically depending reinforcing flanges 14 at the sides and a downwardly extending rear end flange 14, the latter being of sufficient depth to engage the ground when the plate 13 is in horizontal position. This mounting platform 12 is pivoted upon the axle 9 at an intermediate point, providing a portion 16 which extends inwardly of the axle.

The flat shape of the plate 13 is in keeping with the flat shape of the end member 4 and the bottom member 5 and has the same advantages in conforming to the shape of the wheel, avoiding damage to the tire, and increasing the holding friction of the wheel with respect to the emergency truck.

Figure 1 shows graphically the action of a wheel with deflated tire in mounting upon the platform 12. The tire is round, of course, excepting at points where it presses upon the ground and upon the platform. As it mounts upon the platform the major component of the driving force is downward against the top of the platform, as indicated by the arrow $a$ in Figure 1. The value of the pushing component is negligible. The downward pressure of the wheel upon the mounting platform causes the relatively thin bottom edge 17 of the flange 15 to dig into the surface of the pavement sufficiently to hold the emergency truck fixed to the spot while the disabled wheel is mounted thereupon. When the weight of the wheel shifts to the leftward side of the axle 9, as viewed in Figure 3, the mounting platform 12 then tilts up into the broken line position, as shown, forming a chock which cooperates with the inclined front end member 4 to hold the wheel firmly in place.

The outboard mounting of the rear wheels 10 and 11 with respect to the mounting platform 12 and the side members 2 and 3 assures that these wheels will not touch the deflated tire and rub against it and burn it while the automobile with the emergency truck in position is being driven.

Inasmuch as the side members 2 and 3 extend high enough on the inner and outer sides of the wheel to prevent lateral displacement while the wheel is securely chocked against movement in a fore and aft direction and the friction of the wheel with its deflated tire is ample to throw the entire driving torque of the automobile upon the opposite wheel through the differential, the emergency truck will remain in place as a unit with the supported automobile wheel while the latter is being driven, without the necessity of any auxiliary fastening means.

With the aid of such a truck, the automobile can be driven at a fair speed to a repair station without the inconvenience of making a roadside repair or change of tire, and without any damage whatsoever to the deflated tire.

While I have in the above description disclosed what I believe to be a preferred and practical embodiment of the invention, it will be understood to those skilled in the art that the specific details of construction and arrangement of parts as shown and described are by way of example, and not to be construed as limiting the scope of the invention defined in the appended claims.

What I claim as my invention is:

1. Emergency truck for supporting the disabled wheel of an automobile comprising a wheel supported frame, a tiltable chock end comprising a tread member pivoted intermediate its ends with respect to the frame and having on its outer end a depending riser part perpendicular with respect to the tread part, the riser being of a depth equal to the height from the ground of the tread at its pivot.

2. The device of claim 1 in which the tread part of the tiltable chock end is formed with downwardly turned side flanges having their rear edges perpendicular to the tread and in engagement with the riser.

3. Emergency truck for supporting the disabled wheel of an automobile comprising a frame including spaced frame members connected at one end by an inclined end member, wheel axles spanning said frame member at each end, traction wheels on said axles, a tiltable chock end pivoted intermediate its ends between the frame members on one of said axles, said tiltable chock comprising a tread part having at its outer end a riser part perpendicular thereto and of a depth equal to the height from the ground of the tread over that wheel axle.

ERWIN LOUIS SUTTER.